(12) United States Patent
Lee

(10) Patent No.: US 6,383,117 B1
(45) Date of Patent: May 7, 2002

(54) DAMPER CLUTCH CONTROL METHOD FOR AUTOMATIC TRANSMISSION

(75) Inventor: Hee-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 13 days.

(21) Appl. No.: 09/612,376

(22) Filed: Jul. 7, 2000

(30) Foreign Application Priority Data

Jul. 8, 1999 (KR) .......................................... 99-27522

(51) Int. Cl.$^7$ .............................................. B60K 41/02
(52) U.S. Cl. ..................................................... 477/168
(58) Field of Search ........................................ 477/168

(56) References Cited

U.S. PATENT DOCUMENTS

| | | | | |
|---|---|---|---|---|
| 4,768,635 A | * | 9/1988 | Sakurai et al. ............ | 192/0.076 |
| 5,598,336 A | * | 1/1997 | Kume et al. ............ | 364/424.08 |
| 5,651,752 A | * | 7/1997 | Wakahara et al. ............ | 477/181 |
| 5,743,829 A | * | 4/1998 | Tanizawa et al. ............ | 477/174 |
| 5,941,793 A | * | 8/1999 | Ito et al. ...................... | 477/120 |
| 6,059,690 A | * | 5/2000 | Tanizawa et al. ............ | 477/169 |
| 6,231,480 B1 | * | 5/2001 | Sasaki ......................... | 477/174 |

* cited by examiner

*Primary Examiner*—Dirk Wright
(74) *Attorney, Agent, or Firm*—Birch, Stewart, Kolasch & Birch, LLP

(57) ABSTRACT

In a damper clutch control method of a hydraulic control system for automatic transmissions, a damper clutch operation condition is first calculated according to signals from a drive condition detecting part, then it is determined if the calculated value is within a damper clutch operation range on a level road. When the calculated value is within the damper clutch operation range, the pressure control solenoid valve is controlled such that the damper clutch can be operated by hydraulic fluid fed through the damper clutch control valve, then it is determined if a damper clutch release condition on a level road is satisfied or not. When the damper clutch release condition is satisfied, the pressure control solenoid valve is controlled such that the damper clutch can be released by releasing hydraulic fluid from the damper clutch.

4 Claims, 2 Drawing Sheets

DAMPER CLUTCH CONTROL METHOD FOR AUTOMATIC TRANSMISSION

BACKGROUND OF THE INVENTION (a) Field of the Invention

The present invention relates to an automatic transmission for vehicles More particularly, the present invention relates to a damper clutch control method for an automatic transmission which can improve drive performance when the vehicle runs on a slope.

(b) Description of the Related Art

In a vehicle using an automatic transmission, engine power is transmitted to an input shaft of the transmission through a torque converter. To improve the power transmission efficiency, the torque converter is designed having a damper clutch disposed between a turbine and an impeller. That is, when the damper clutch is operated or engaged, the engine is directly connected to the input shaft of the transmission.

The operation of the damper clutch is controlled in accordance with an engine rpm, a throttle opening and a vehicle speed. That is, a transmission control unit TCU analyzes a rotational slip rate between the impeller and the turbine according to the engine rpm, the throttle opening and the vehicle speed, then directly connects the damper clutch with the input shaft according to the analyzed results to improve the fuel-consumption ratio and maintain vehicle speed.

However, in the conventional art, since the control of the damper clutch operation is set only on the basis of a flat road, it is difficult to improve the driving performance when the vehicle runs on a slope. That is, the conventional damper clutch is designed not to operate in a low-speed range (up to the vicinity of 60 km/h), deteriorating the fuel consumption ratio.

SUMMARY OF THE INVENTION

Therefore, the present invention has been made in an effort to solve the above problems.

It is an objective of the present invention to provide a damper clutch control system for an automatic transmission which can improve a driving performance of a vehicle when the vehicle runs on a slope.

To achieve the above objective, the present invention provides a damper clutch control method of a hydraulic control system for automatic transmissions, the hydraulic control system comprising a drive condition detecting part for detecting a drive condition of a vehicle and outputting corresponding signals, a pressure control solenoid valve, a transmission control unit for duty-controlling the pressure control solenoid valve in accordance with the signals from the drive condition detecting part, and a damper clutch control valve for selectively supplying hydraulic pressure to a damper clutch in accordance with the operation of the pressure control solenoid valve, the damper clutch control method comprising the steps of calculating a damper clutch operation condition according to signals from the drive condition detecting part, determining if the calculated value is within a damper clutch operation range on a level road, controlling, when the calculated value is within the damper clutch operation range, the pressure control solenoid valve such that the damper clutch can be operated by hydraulic fluid fed through the damper clutch control valve, determining if a damper clutch release condition on a level road is satisfied or not, controlling, when the damper clutch release condition is satisfied, the pressure control solenoid valve such that the damper clutch can be released by releasing hydraulic fluid from the damper clutch.

The damper clutch control method may further comprise the steps of determining if the damper clutch operation on a slope is satisfied or not when the damper clutch operation condition on the level road is not in the damper clutch operation range, calculating the gradient of the slope when the damper clutch operation on the slope is satisfied, determining if a slope running time is longer than a standard running time when the calculated gradient is greater than the standard gradient, duty-controlling, when the slope running time is longer than the standard running time, the pressure control solenoid valve such that the damper clutch control valve supplies hydraulic pressure to the damper clutch to operate the damper clutch, calculating a gradient of the slope, determining if a damper clutch release condition under the calculated gradient is satisfied or not, and controlling, when the damper clutch release condition under the calculated gradient is satisfied, the pressure control solenoid valve such that the hydraulic pressure fed to the damper clutch is released.

The standard gradient is about 5%.

The standard running time is about 5 seconds.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
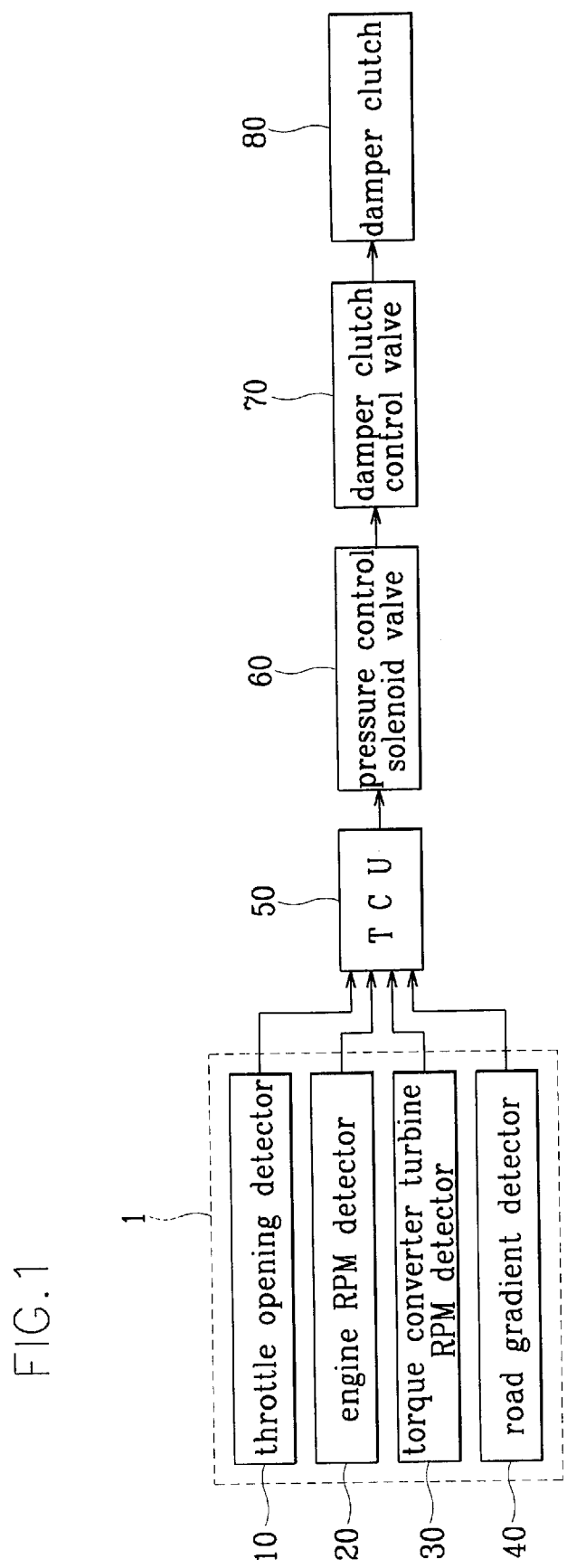
FIG. 1 is a block diagram of a damper clutch control system which can be applied to the present invention.

FIG. 1 shows a block diagram of a damper clutch control system which can be applied to the present invention.

The damper clutch control system applicable to the present invention comprises a drive condition detecting part 1 for detecting the drive condition of a vehicle and outputting corresponding signals, the drive condition detecting part 1 having a throttle opening detector 10, an engine RPM detector 20, a torque converter turbine RPM detector 30 and a road gradient detector 40; a transmission control unit (TCU) 50; a pressure control solenoid valve 60; and a damper clutch control valve 70.

The throttle opening detector 10 detects a throttle opening and outputs a corresponding signal to the TCU. The engine RPM detector detects an engine RPM and outputs a corresponding signal to the TCU. The turbine RPM detector 30 detects an RPM of a turbine rotating by means of hydraulic fluid or the engine by the operation of the damper clutch, and a road gradient detector 40 detects a gradient of a slope where the vehicle runs according to engine power, accelerating resistance, air resistance, and rolling resistance.

The TCU 50 analyzes signals from the detectors 10, 20, 30, and 40 and controls duty ratios with respect to synchronization of a gear ratio. The TCU further controls the operation of the damper clutch by outputting a predetermined signal for duty-controlling the hydraulic fluid on a level road or a slope.

The pressure control solenoid valve 60 is controlled according to duty control signals transmitted from the TCU 50 to control the operation of hydraulic pressure of the damper clutch.

The damper clutch control valve 70 is designed to perform its port conversion according to the operation of the pressure control solenoid valve 60, thereby controlling hydraulic fluid directed to the damper clutch.

Figure 2:
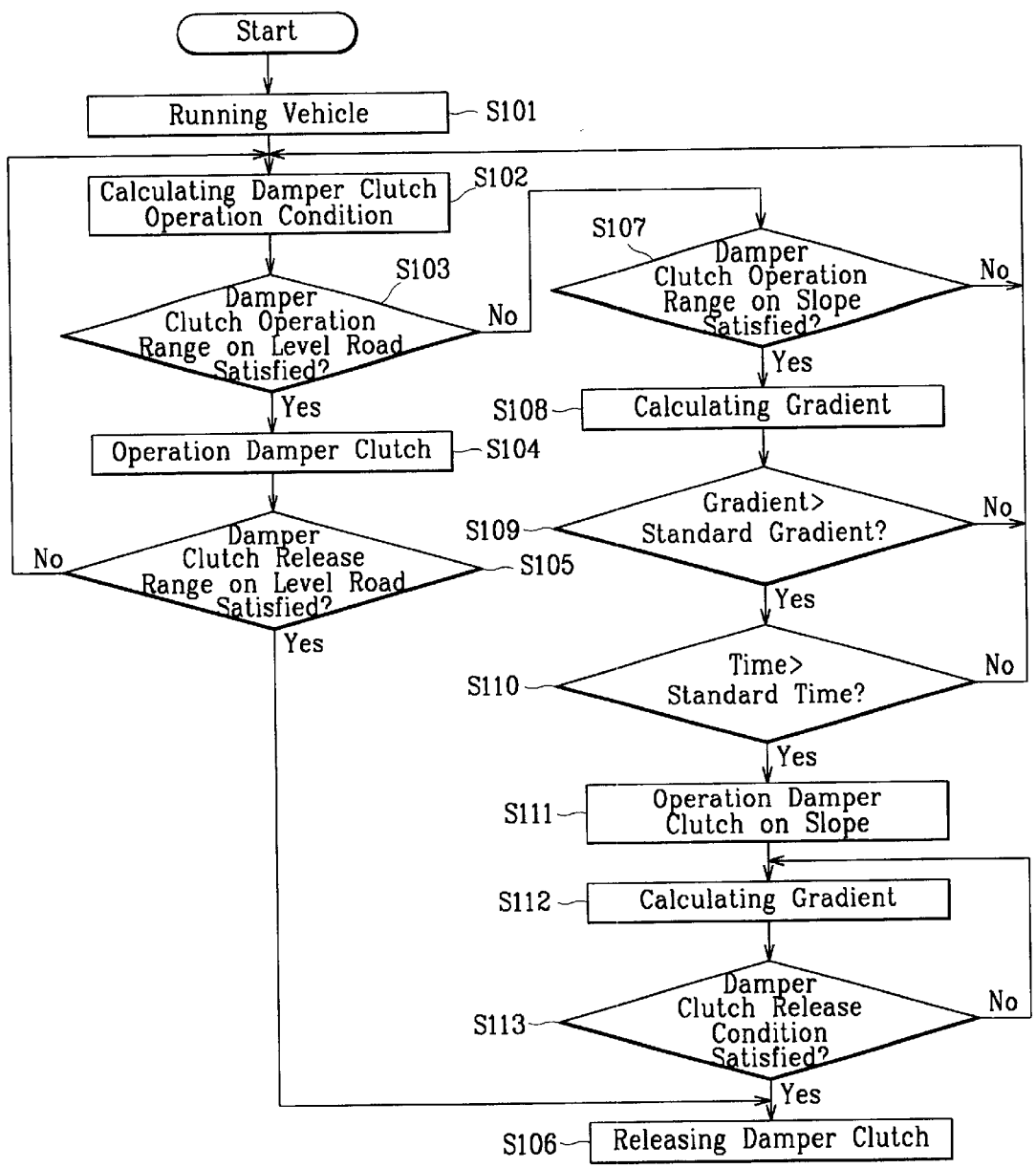
FIG. 2 is a flow chart of a damper clutch control method according to a preferred embodiment of the present invention.

FIG. 2 shows a flowchart illustrating a method for controlling a damper clutch according to a preferred embodiment of the present invention.

When the vehicle runs at a predetermined speed (S101), the TCU 50 calculates a damper clutch operation condition according to signals from the throttle opening detector 10, the engine RPM detector, the turbine RPM detector, and the road gradient detector 40 of the drive condition detecting part 1 (S102).

In Step S103, the TCU determines if the calculated value is within a damper clutch operation range on a level road.

When the calculated value is within a damper clutch operation range on the level road, the TCU controls the pressure control solenoid valve 60 such that the damper clutch can be operated by hydraulic fluid fed through the damper clutch control valve 70 (S104). That is, the damper clutch operation range is enlarged to include a low speed region of lower than 60 km/h.

Following the above, the TCU determines if a damper clutch release condition on a level road is satisfied or not (S105). When the damper clutch release condition is satisfied, the TCU controls the pressure control solenoid valve 60 such that the damper clutch can be released by releasing hydraulic fluid from the damper clutch 80 (S106). When the damper clutch release condition is not satisfied in Step S105, the control step is returned to Step 102 to determine if the damper clutch operation condition is satisfied or not.

When the damper clutch operation condition on the level road is not in the damper clutch operation range in Step S103, the TCU determines if the damper clutch operation on a slope is satisfied or not (S107). When the damper clutch operation on the slope is satisfied, the TCU calculates the gradient of the slope (S108). In Step S109, the TCU determines if the calculated gradient of the slope is greater than a standard gradient or not.

When the calculated gradient is not greater than the standard gradient, the process is returned to Step S102, and when it is greater, the TCU determines if a slope running time is longer than a standard running time (S110).

When the slope running time is not longer than the standard running time, the process is returned to Step S102, and when it is longer, the TCU duty-controls the pressure control solenoid valve 60 such that the damper clutch control valve supplies hydraulic pressure to the damper clutch to operate the damper clutch (S111).

Following the above, the TCU calculates a gradient of the slope in Step S112, then determines if a damper clutch release condition under the calculated gradient is satisfied or not (S113).

Preferably, the standard gradient is about 5% and the standard running time is about 5 seconds. When the damper clutch release condition under the calculated gradient is not satisfied, the process is returned to Step S112, and if satisfied, the TCU controls the pressure control solenoid valve such that the hydraulic pressure fed to the damper clutch is released (S106).

As described above, since the damper clutch operation is controlled according to a gradient of a road, the damper clutch operation range can be enlarged at a low speed range on a level road, improving the fuel consumption ratio.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A damper clutch control method of a hydraulic control system for automatic transmissions, the hydraulic control system comprising a drive condition detecting part for detecting a drive condition of a vehicle and outputting corresponding signals, a pressure control solenoid valve, a transmission control unit for duty-controlling the pressure control solenoid valve in accordance with the signals from the drive condition detecting part, and a damper clutch control valve for selectively supplying hydraulic pressure to a damper clutch in accordance with the operation of the pressure control solenoid valve, the damper clutch control method comprising the steps of:

calculating a damper clutch operation condition according to signals from the drive condition detecting part;

determining if the calculated value is within a damper clutch operation range on a level road;

controlling, when the calculated value is within the damper clutch operation range, the pressure control solenoid valve such that the damper clutch can be operated by hydraulic fluid fed through the damper clutch control valve;

determining if a damper clutch release condition on a level road is satisfied or not;

controlling, when the damper clutch release condition is satisfied, the pressure control solenoid valve such that the damper clutch can be released by releasing hydraulic fluid from the damper clutch;

determining if a damper clutch operation condition on a slope is satisfied or not;

calculating a gradient of the slope when the damper clutch operation condition on the slope is satisfied;

determining if a slope running time and the calculated gradient satisfy a predetermined condition;

duty-controlling when the slope running time and the calculated gradient satisfy the predetermined condition the pressure control solenoid valve such that the damper clutch control valve supplies hydraulic pressure to the damper clutch to operate the damper clutch;

determining if a damper clutch release condition is satisfied or not; and controlling, when the damper clutch release condition is satisfied, the pressure control solenoid valve such that the hydraulic pressure fed to the damper clutch is released.

2. A damper clutch control method of claim 1 wherein the standard gradient is about 5%.

3. A damper clutch control method of claim 1 wherein the standard running time is about 5 seconds.

4. A damper clutch control method of claim 1, wherein:

the predetermined condition includes a first condition of the slope running time being no longer than a standard running time and a second condition of the calculated gradient of the slope being greater than a standard gradient, said determining if a slope running time and the calculated gradient satisfy a predetermined condition determines that the slope running time and the calculated gradient satisfy the predetermined condition if the first and second conditions are satisfied, and said determining if a damper clutch release condition is satisfied or not determines if the damper clutch release condition is satisfied or not on the basis of a gradient of the slope.

* * * * *